(12) United States Patent
Ijeomah et al.

(10) Patent No.: US 8,127,327 B2
(45) Date of Patent: Feb. 28, 2012

(54) METHOD FOR PROVIDING MULTIPLE STREAMS IN DIGITAL MEDIA AND TO SELECT VIEWABLE CONTENT BASED ON GEOGRAPHY

(75) Inventors: Shaun Ijeomah, Poughkeepsie, NY (US); Kevin H. Peters, Germantown, NY (US); Louis R. Ruggiero, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 11/957,956

(22) Filed: Dec. 17, 2007

(65) Prior Publication Data
US 2009/0154548 A1    Jun. 18, 2009

(51) Int. Cl.
*H04N 7/025* (2006.01)

(52) U.S. Cl. .......................................... 725/35; 725/34
(58) Field of Classification Search ....................... None
See application file for complete search history.

(56) References Cited

U.S. PATENT DOCUMENTS
6,496,981 B1    12/2002    Wistendahl et al.
(Continued)

*Primary Examiner* — Donald Mills
(74) *Attorney, Agent, or Firm* — Cantor Colburn LLP; William A. Kinnaman, Jr.

(57) ABSTRACT

A method for selectively displaying viewing content based on geographic considerations, the method includes: decoding audio/video (A/V) information; detecting geographic identifiers in the A/V information; displaying specific portions of the A/V information associated with the geographic identifiers, in response to one or more geographic considerations; and wherein the A/V information is from one or more information streams inserted in a single digital broadcast or digital media.

5 Claims, 2 Drawing Sheets

U.S. PATENT DOCUMENTS

| | | |
|---|---|---|
| 6,714,215 B1 | 3/2004 | Flora et al. |
| 6,848,002 B1 | 1/2005 | Detlef |
| 6,996,612 B1 * | 2/2006 | McCullough ................. 709/224 |
| 7,032,236 B1 * | 4/2006 | Ozkan et al. ..................... 725/39 |
| 7,039,933 B1 * | 5/2006 | Chen et al. ...................... 725/36 |
| 7,188,085 B2 | 3/2007 | Pelletier |
| 7,500,258 B1 * | 3/2009 | Eldering ......................... 725/32 |
| 7,849,477 B2 * | 12/2010 | Cristofalo et al. .............. 725/34 |
| 7,877,290 B1 * | 1/2011 | Arsenault et al. ............ 705/14.4 |
| 7,921,136 B1 * | 4/2011 | Shuman et al. ................ 707/802 |
| 7,934,233 B2 * | 4/2011 | Zimmerman et al. .......... 725/46 |
| 2003/0049014 A1 | 3/2003 | Siddiqui |
| 2004/0261099 A1 | 12/2004 | Durden et al. |
| 2005/0060759 A1 | 3/2005 | Rowe et al. |
| 2005/0193410 A1 | 9/2005 | Eldering |

* cited by examiner

METHOD FOR PROVIDING MULTIPLE STREAMS IN DIGITAL MEDIA AND TO SELECT VIEWABLE CONTENT BASED ON GEOGRAPHY

BACKGROUND OF THE INVENTION

1. Field of the Invention

This invention relates generally to digital video and media content, and more particularly to a method for selectively displaying viewing content based on geographic considerations from multiple information streams in a single digital broadcast or digital media.

2. Description of the Related Art

The availability and use of digital video and media content has grown tremendously in the last decade, and will soon virtually replace all analog transmission and recording.

A widespread application of digital video is Digital television (DTV). DTV is a telecommunication system for broadcasting and receiving moving pictures and sound by means of a digital signal, in contrast to an analog signal used by analog (traditional) TV. DTV utilizes the digital modulation of analog signal data, which is digitally compressed prior to recording or broadcast. The digitally compressed signal requires decoding by a specially designed receiver within a television set, or a standard receiver with a set-top box, or a PC fitted with a television card. Digital television has several advantages over traditional analog TV, the most significant being that digital channels take up less bandwidth space. The reduced bandwidth of a digital broadcast signal enables digital broadcasters to provide more digital channels in the same space, provide High-Definition (HD) digital service, or provide other non-television services such as pay-multimedia services or interactive services. Digital television also permits special services such as multicasting (more than one program on the same channel), electronic program guides, and program identification.

SUMMARY OF THE INVENTION

Embodiments of the present invention include a method for selectively displaying viewing content based on geographic considerations, the method includes: decoding audio/video (A/V) information; detecting geographic identifiers in the A/V information; displaying specific portions of the A/V information associated with the geographic identifiers, in response to one or more geographic considerations; and wherein the A/V information is from one or more information streams inserted in a single digital broadcast or digital media.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a method and system for providing and selecting viewable content from multiple streams of digital video in a single digital broadcast or digital media based on geographic considerations.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
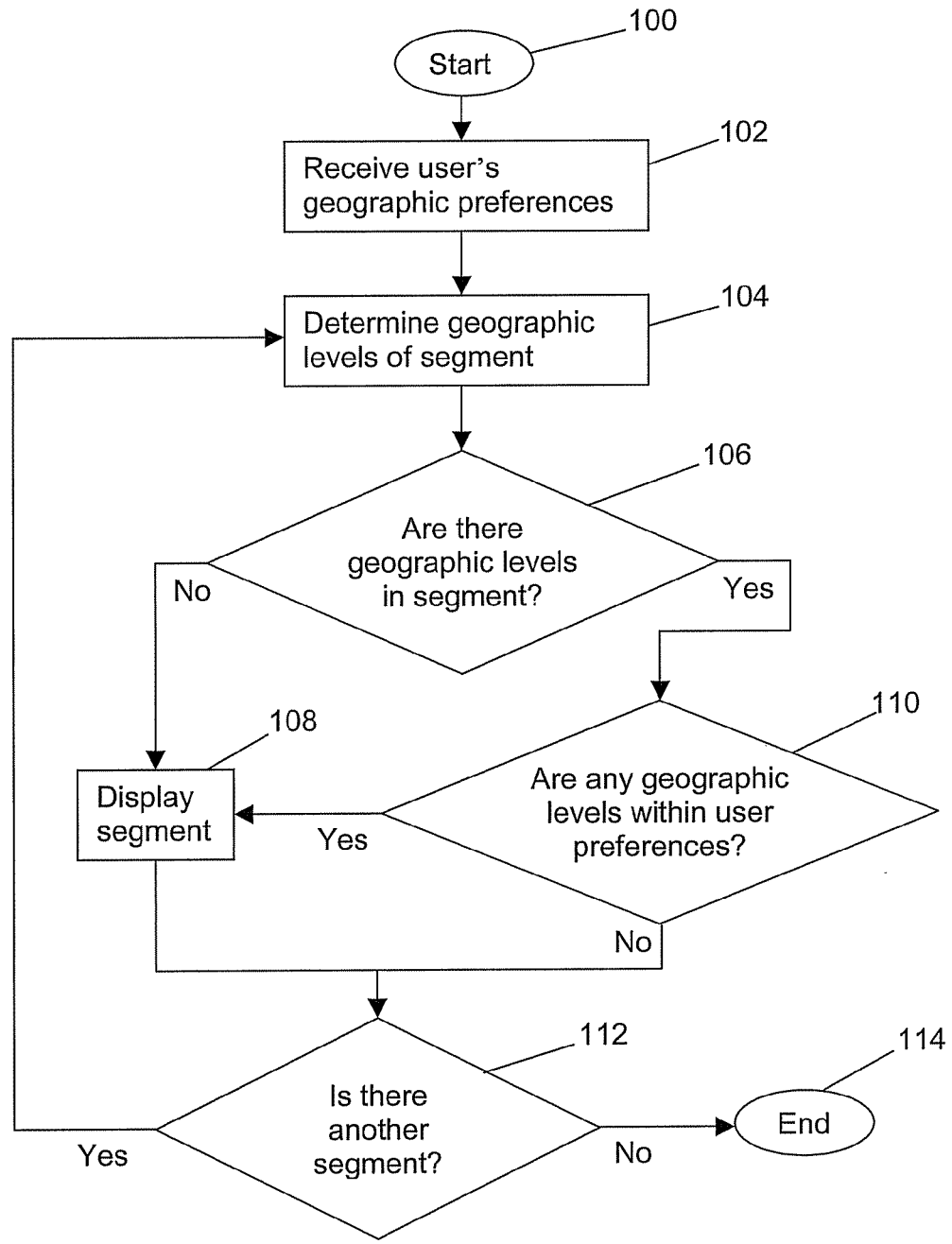
FIG. 1 illustrates a flow chart for a method for displaying segments of digital audio and video based on user geographic preferences according to embodiments of the invention.

The detailed description explains the preferred embodiments of the invention, together with advantages and features, by way of example with reference to the drawings.

DETAILED DESCRIPTION

Embodiments of the invention provide a system and method for the incorporation of multiple information streams in single digital audio/video (A/V) media instance (e.g., DVD, CD, etc.) or digital audio/video content stream (e.g., movie, broadcast show, etc.) based on geographical parameters, and provides for real time viewing of the digital media or video stream by geographic preference(s). The single digital A/V media instance contains multiple flagged interleaved geographic content and allows playback (live broadcast or from physical media) to be selectable by default and dynamic geographic setting(s). Users may select viewable content by geographic preference(s), such as for example by continent, nation, region, state/province, zip code, school or electoral district.

In embodiments of the invention, a digital A/V content stream may be downloaded as a single stream, for real time or later decoding and separation into separate audio/video (A/V) content based on geographic parameters and preferences. The decoding may be accomplished with decoding logic found in an "extended" enabled V-chip device (where the "V" stands for viewer control, and are currently configured to offer viewers the option of blocking out content based on the content's assigned rating), or alternative software/hardware solutions found in digital video recorders (DVR), set top boxes for cable or satellite television, or integrated directly into the viewing device (e.g., television, computer, mobile device, etc.), or digital media content player. The aforementioned extended enabled V-chip, and the alternative software/hardware solutions are configured for geographic selection(s), and the setting of priority of the selections, via controls on the equipment or via remote controlled input. The arrows buttons (or equivalent) on the remote control, graphical user interface, or electronic program guide (EPG) may be used to dynamically alter selection(s) after a geographic level has been chosen. Also, multiple geographic levels may be selected, which is especially helpful with education/training materials for specific targeted audiences or users.

Embodiments of the invention provide advertisers with the ability to pinpoint perspective clients with geographic based advertising. For example, advertising of four-wheel drive vehicles may be targeted to the Northern U.S. during winter, while advertising of condos and golf may be targeted to the Southern U.S. at the same time. The geographically targeted advertising would allow broadcasters to increase revenue, since pinpointed advertising commands higher rates than general advertising. While each pinpointed stream may cost less than a single widespread advertisement, multiple streams with each stream at a premium slightly higher than the proportional rate would generate more overall revenue.

An additional benefit of using embodiments of the invention is a single stream with different content versions would be more cost effective and easier to make and distribute.

Different geographical versions of the same base material would be easier to make since there would be only one instance of the digital A/V media that includes all the geographical variations, and the "base" material that applies to all the geographies would not have to be duplicated for each separate region. Downloading different versions within the same data stream, such as a sales or educational or instructional movie, is more efficient than totally separate versions, since an intertwined version would only be slightly longer version than a single geographic content version. The multiple versions in a single data stream, would save on storage within a consumer's downloading device, and save on associated processing costs for the originating producer of the digital content. For instance, a single consolidated sales incentive video may be made for an entire company, and as each sales territory office plays the video, each individual territory would only be shown the sales incentives and commission rates for their area (based on selection(s) for a continent, country, region level. etc). In addition, for educational applications, a DVD with geographical coding features of embodiments of the invention, may be played multiple times, with different geographic selections or preferences, to see the same lesson from different geographic perspectives.

Embodiments of the invention may offer users automated selection of the associated geographic view level setting(s), by utilizing local settings, such as Personal Computer "code page" translations settings, language settings and/or global positioning system (GPS) settings within the device. For example, software may determine geographic location, and prompt the end user to verify the geographical settings, by translating a current GPS reading and/or Regional/Language/Code page settings within the "Regional and Language Options" within the Control Panel of a Personal Computer. The software may display the discovered geographic preferences, and allow the end user to use these settings as a default, to change their current settings, or use only for this viewing.

Embodiments of the invention utilize digital A/V media and digital A/V content that has a series of program segments, frames, and/or scenes, where each segment has one or more geographical content labels. In order to avoid a delay in the display of a scene for a specific geography, the content of the media should have the separate program segments for the different geographies available in a buffer prior to the required display for a following scene segment. To avoid delays in the presentation of A/V content, embodiments of the invention may be configured with technology similar to disk skip technology in DVD/CD players that reads ahead "n" number of seconds, looks for user selected material based on geographic preferences, and forwards the specified content to the digital A/V player or display buffer.

For example, a digital A/V information stream may be encoded with two geographically distinct content segments or frames in the overall information stream. In this example, frames 1-10 have no geographic preferences assigned. However, frame 11A is assigned a first geographic preference (U.S.), and frame 11B is assigned a second geographic preference (Spain). The first ten frames with no geographic preference will be displayed on the display device. If the customer had a geographic preference for Spain, frame 11A would be skipped, and frame 11B would be displayed. The remaining "Frames With No Preference" would be displayed.

FIG. 1 illustrates a flow chart for a method for displaying segments of digital audio and video based on user geographic preferences according to embodiments of the invention. Referring to FIG. 1, a user of the digital A/V player or display device starts (block 100) by entering one or more geographic preferences via a graphical user interface, into a V-chip or other hardware/software interfaces (block 102). Each time the A/V player or display device is started for A/V media or content, the A/V player or display device will retrieve the user's geographical preferences, and determine geographic levels of the A/V segments. The start (block 100) also includes instances where the A/V media or content is paused and the settings are changed. Additionally, at start (block 100), any additional user preference based files (such as code page, language settings and/or Global Positioning) may be translated to geographical preferences. The user may be prompted if they want to automatically change their settings (for instance, when traveling with an A/V player with a global positioning satellite (GPS) device), and if they want to be prompted for manual changes, or to never change settings based on these features.

Continuing with FIG. 1, following the reception and/or converting of user preferences, the A/V player or display device will read a segment into a buffer and determine if there is a geographic content marker or identifier in the segment (block 104). If there are no geographic markers or identifiers in a segment (decision block 106 is No), the segment will be displayed (block 108). In an alternative embodiment, display segments with no geographical markers may not be displayed. If there is a geographic marker in the segment (decision block 106 is Yes), the A/V player or display device will read a segment into a buffer and determine if the user's geographic preference are present with in the segment (decision block 110). If the user's geographic preferences match the geographic level in the segment (decision block 110 is Yes), the particular geographically directed segment will be displayed (block 108), and the A/V player the look for the next segment (decision block 112). If the user's geographic preferences do not match (decision block 110 is No), and the particular geographically directed segment is not displayed and the process goes directly to looking for the next segment (decision block 112). If there are no more segments (decision block 112 is No), the A/V player or display finishes the A/V presentation (block 114). If there are additional segments in the A/V presentation (decision block 112 is Yes), the next segment is examined for geographic specification of levels (block 104) and the process continues as outlined above.

Figure 2:
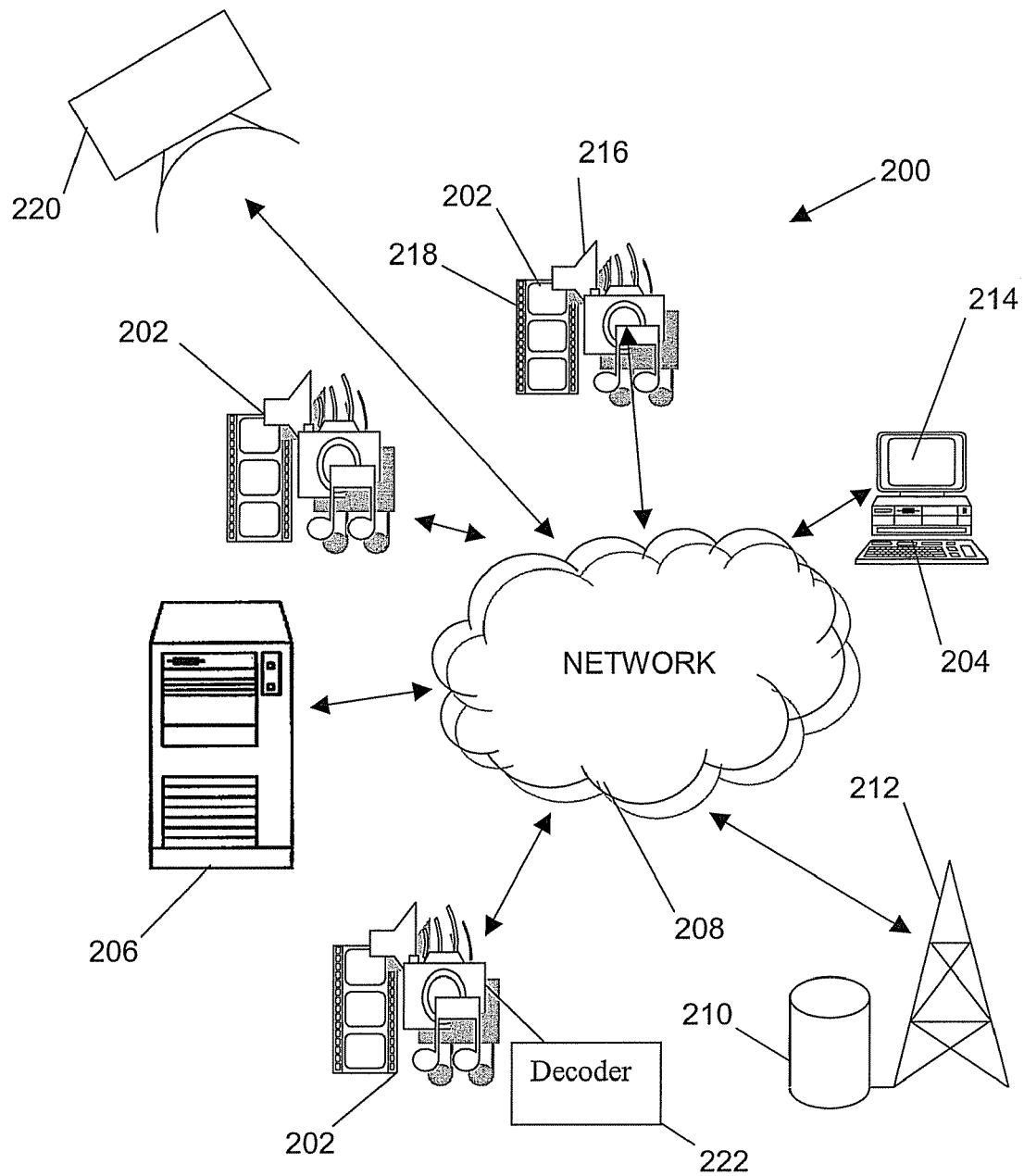
FIG. 2 illustrates a system for implementing embodiments of the invention.

FIG. 2 illustrates an exemplary system 200 for providing and selecting viewable content from multiple streams of digital audio and video in a single digital broadcast or digital media based on geographic considerations according to embodiments of the invention. The system 200 includes multimedia devices 202, and desktop computer devices 204 configured with digital video reception and playback capabilities 214. The multimedia devices 202 may be digital televisions, and mobile communication and entertainment devices, such as cellular phones and mobile computing devices that are wirelessly connected to a network 208. The multimedia devices 202 have video displays 218 and audio outputs 216. The network 208 may be any type of known network including a fixed wire line network, cable and fiber optics, over the air broadcasts, satellite 220, local area network (LAN), wide area network (WAN), global network (e.g., Internet), intranet, etc. with data/Internet capabilities as represented by server 206. Communication aspects of the network are represented by cellular base station 212 and antenna 210. Decoders 222 may be externally connected to the multimedia devices 202 and desktop computers 204, integrated into the multimedia devices 202 and desktop computers 204, or contained on a smart card that is inserted into an available slot in the multimedia devices 202 and desktop computers 204.

User subscription profiles and databases for geographic preferences for A/V content may be resident on the individual multimedia devices 202 and desktop computers 204, or stored within the server 206 or cellular base station 210. The software for running the determining and implementing geographic preferences for A/V content may be resident on the server 206 or cellular base station 210.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for selectively displaying viewing content based on geographic considerations by a digital audio/video (A/V) player, wherein the method comprises:

decoding the received audio/video (A/V) information by the digital A/V player;

detecting geographic identifiers in the decoded A/V information by the digital A/V player;

displaying specific portions of the A/V information associated with the geographic identifiers, in response to one or more geographic considerations, wherein the geographic considerations are automatically determined from global positioning system (GPS) readings by a GPS device associated with the digital A/V player; and wherein the A/V information is from one or more information streams inserted in a single digital broadcast or digital media, and wherein in the event a specific portion of the A/V information does not include a geographic identifier, the specific portion of the A/V information that does not include the geographic identifier is not displayed by the digital A/V player.

2. The method of claim 1, wherein the geographic considerations are based on user input preferences.

3. The method of claim 1, wherein geographic considerations include one or more of the following: continent, nation, region, state, province, zip code, school district, and electoral district.

4. The method of claim 1, wherein the geographic considerations are automatically determined from display or playback device settings.

5. The method of claim 1, wherein the decoding is performed is with a V-chip configured to detect the geographic identifiers.

* * * * *